United States Patent
Brabec

(10) Patent No.: US 8,634,615 B2
(45) Date of Patent: Jan. 21, 2014

(54) METHOD OF FILTERING AN IMAGE DATASET

(75) Inventor: Stefan Brabec, Starnberg (DE)

(73) Assignee: Tomtec Imaging Systems GmbH (DE)

( * ) Notice: Subject to any disclaimer, the term of this patent is extended or adjusted under 35 U.S.C. 154(b) by 134 days.

(21) Appl. No.: 13/122,931

(22) PCT Filed: Oct. 8, 2008

(86) PCT No.: PCT/EP2008/063448
§ 371 (c)(1),
(2), (4) Date: Jul. 1, 2011

(87) PCT Pub. No.: WO2010/040396
PCT Pub. Date: Apr. 15, 2010

(65) Prior Publication Data
US 2011/0262023 A1   Oct. 27, 2011

(51) Int. Cl.
*G06K 9/00* (2006.01)

(52) U.S. Cl.
USPC .......................................... 382/128

(58) Field of Classification Search
None
See application file for complete search history.

(56) References Cited

U.S. PATENT DOCUMENTS

| 5,409,007 A * | 4/1995 | Saunders et al. ............. 600/447 |
| 8,285,362 B2 * | 10/2012 | Dietz et al. ................... 600/424 |
| 2004/0081340 A1 * | 4/2004 | Hashimoto ................... 382/128 |

FOREIGN PATENT DOCUMENTS

EP   1755082 A2 *   2/2007

OTHER PUBLICATIONS

International Search Report and Written Opinion issued Feb. 9, 2009 by European Patent Office re: International Application No. PCT/EP2008/063448.
Q.H. Huang et al. "Development of a portable 3D ultrasound imaging system for musculoskeletal tissues", Ultrasonics, IPC Science and Technology Press Ltd. Guildford, Jan. 1, 2005, pp. 153-163, vol. 43, No. 3, GB.

* cited by examiner

*Primary Examiner* — Stephen R Koziol
*Assistant Examiner* — Raphael Schwartz
(74) *Attorney, Agent, or Firm* — Cantor Colburn LLP

(57) ABSTRACT

A method of filtering an image dataset and an apparatus, a data carrier, and a computer program product, the method having the following steps: providing an N-dimensional input image dataset; applying a filtering algorithm to the input image dataset, wherein the filtering algorithm is essentially unvarying over the dataset, to thereby obtain a filtered image dataset; providing a spatially varying weighting function between the input and the filtered image datasets; computing a weighted sum of the input image dataset and the filtered image dataset, thereby using the spatially varying weighting function, in order to obtain an output image dataset.

20 Claims, 6 Drawing Sheets

METHOD OF FILTERING AN IMAGE DATASET

TECHNICAL FIELD

The present invention relates to a method of filtering an image dataset, in particular a two- or three-dimensional image dataset obtained by a medical imaging technique. The invention is also directed to an apparatus for processing an image dataset, a data carrier and a computer program product.

BACKGROUND

Medical images often contain substantial amounts of noise which has to be reduced to improve the diagnostic value of the images. To reduce noise and other artefacts, various filtering and smoothing techniques, in particular low-pass filtering for noise reduction is known in the art.

In particular, raw ultrasound data is usually filtered before the image is used for further processing, such as volume rendering of a three-dimensional dataset.

Raw ultrasound image data, however, are often not immediately available in Cartesian coordinates, but in acoustic coordinates. A two-dimensional image slice, for example, usually has the shape of a fan, because the ultrasound beams diverge from the ultrasound transducer. Therefore, the pixels along one ultrasound beam will have a varying size: The pixels closer to the transducer (the near-field) cover a smaller area each, due to the close spacing of the ultrasound beams, while the pixels far away from the transducer (the far-field) are more spaced out and therefore larger in azimuthal direction. The same problem arises if a three-dimensional image is acquired by means of a mechanical sector scanner. Such a scanner comprises an ultrasound transducer which is pivotally mounted and rotates in between individual scans by a certain angle. With this geometry, a three-dimensional dataset will have the form of a cone with acoustic coordinates. An acoustic coordinate system may be approximately like polar coordinates, but may also be different and is often specific to the device manufacturer.

When applying a normal filtering/smoothing method using a fixed kernel on a dataset having a spatially varying pixel size as described above, the kernel will be too small for those areas where the pixels are close together (in the near-field), and too big for those areas in the far-field where the pixels are far apart. Therefore, there will be too much details lost in the far-field, while the filtering/smoothing may not be sufficient in the near-field.

One solution to this problem is to resample the data to Cartesian coordinates before rendering. However, this resampling step is time intensive and therefore not suitable for real-time applications.

Another solution would be to vary the size of the filter kernel over the image dataset. The main drawback of such a spatially varying kernel is the computational complexity: For each voxel a suitable kernel size has to be determined and the corresponding kernel weights have to be computed. This is acceptable for offline pre-processing, but not suitable for real-time applications that need to run at 20 Hz or higher.

BRIEF SUMMARY

The invention provides a filtering method which is suitable for real-time applications.

The proposed filtering method is an approximation to a real spatially varying filter. However, the computational effort is nearly equal to the standard, fixed kernel size filtering.

The method of filtering an image dataset comprises the following steps: providing an N-dimensional input image dataset; applying a filtering algorithm to the input image dataset, wherein the filtering algorithm is essentially unvarying over the dataset, to thereby obtain a filtered image dataset; providing a spatially varying weighting function between the input and the filtered image datasets; computing a weighted sum of the input image dataset and the filtered image dataset, thereby using the spatially varying weighting function, in order to obtain an output image dataset.

The N-dimensional input image dataset is preferably a one-dimensional (1D), two-dimensional (2D), three-dimensional (3D) or four-dimensional (4D) dataset. The first to third dimensions are preferably spatial dimensions, wherein the fourth dimension can be time. Thus, a 4D dataset can be a time series of several 3D image datasets. An image dataset is generally a set of data, wherein each data point reflects the value of a certain property of an imaged object at a certain position in space. For example, the pixel value of an X-ray image reflects the X-ray absorption rate of the tissue along the X-ray corresponding to the pixel.

A picture element corresponding to a certain data point of a 2D image is called a pixel, whereas the volume elements corresponding to the data points of 3D images are called voxels.

Generally, the input image dataset may provide an image of any type of object in space. For the purposes of the invention, it is preferred that the input image dataset is a medical image, such as an image dataset acquired with ultrasound, magnetic resonance imaging, X-ray, computed tomography, or near-infrared imaging. The input image dataset may include image data of a part of the human or animal body, most preferably the heart, any other internal organ or a fetus. Most preferred, the filtering method of the invention is applied to raw volume data acquired by ultrasound, e.g. a 3D image dataset in so-called acoustic space.

Preferably, the filtering algorithm is a noise reduction algorithm. A noise reduction method is a certain type of filtering method which is meant to reduce noise, while preserving most of the information content of the image. For example, a noise reduction algorithm may comprise averaging data points with their neighbouring data points in an image dataset. Preferably, the noise reduction corresponds to a low-pass filter, i.e. a filter which suppresses the high spatial frequencies. The noise reduction algorithm may be a smoothing algorithm.

The filtering algorithm which is applied to the input image dataset is essentially unvarying over the dataset, which means that every pixel or voxel within the dataset is essentially treated in the same way, with the possible exception of the pixels or voxels near the edges of the dataset, where the algorithm may be adapted to compensate for edge effects. Thus, "essentially unvarying" means that the filtering or noise reduction algorithm should be unvarying at least over the central pixels or voxels of the dataset, if not over all pixels or voxels.

The word "unvarying" is to be understood in relation to the dataset, or in other words in voxel space. In real space, the filtering algorithm might be spatially varying, for example if the input image dataset is not Cartesian, but has a spatially unvarying pixel/voxel size.

The filtering algorithm preferably comprises averaging each pixel/voxel value over the neighbouring pixels/voxels. This may preferably be accomplished using a kernel smoother, wherein each filtered pixel/voxel value $Y_{filtered}$ at position $X_0$ is computed as the sum of every pixel/voxel value $Y(X_i)$, weighted with a so-called kernel function $K(X_0, X_i)$:

$$Y_{filtered}(X_0) = \sum_{i=0}^{N} \frac{K(X_0, X_i)Y(X_i)}{K(X_0, X_i)}$$

wherein N is the number of pixels/voxels in the data set. The kernel defines the shape of the function which is used to take the average of the neighbouring data points.

Preferably, the filtering algorithm comprises a kernel smoothing algorithm using a kernel size which does not vary over the image dataset, and is thereby essentially unvarying over the dataset. Most preferably, not only the kernel size, but also the kernel itself does not vary over the dataset. The kernel is preferably a box function or a Gaussian kernel.

After the filtering step, the input image dataset is kept, and the filtered image dataset is preferably also stored in some kind of data storage. The filtered image dataset preferably has the same dimension (i.e. data structure, including number of pixels/voxels in each direction) as the input image dataset.

The weighting function between the input and the filtered image datasets can be for example an algebraic function having a certain value (for example between 0.1, 0.2 or 0.3, and 1) for each data point of the input image dataset. For example, the weighting function may vary linearly, exponentially or polynomially over 1, 2 or 3 spatial variables of the input image dataset (such as x, y or z).

Alternatively, the weighting function may simply be a scalar dataset having the same dimensions (i.e. number of pixels/voxels in each direction) as the input image dataset and the filtered image dataset, and containing a weighting factor for each pixel/voxel of the input image dataset.

Such scalar dataset may be computed as part of the inventive method, or may be predetermined. Furthermore, the weighting function may be user-defined.

The weighting function is spatially varying, which means that the value of the weighting function varies with at least one spatial variable of the input image dataset, e.g. with x, y and/or z.

Computing a weighted sum of the input image dataset and the filtered image dataset, thereby using the spatially varying weighting function, means that each pixel/voxel value of the input image dataset is weighted with the weighting function, and somehow combined (i.e. added, multiplied ...) with the corresponding pixel/voxel value from the filtered image dataset. The combination or weighted sum of these two values gives the corresponding pixel/voxel value of the output image dataset.

If the weighting function for a pixel/voxel at position X can be written as W(X), the pixel/voxel value of the input image dataset at the corresponding position as I(X), the pixel/voxel value of the filtered image dataset at the corresponding position as S(X) and the pixel/voxel value of the output image dataset at the corresponding position as O(X), the weighted sum may preferably be computed according to the following equation, which describes a linear weighted sum:

$$O(X)=I(X)W(X)+S(X)[W(X)-1]$$

The above formula assumes that the weighting function W is always between 0 and 1. If this is not the case, the weighted sum has to be normalised.

The main benefit of the inventive filtering method is that the computational effort is almost the same as with a standard, fixed kernel size filtering. In fact, the step of applying the filtering algorithm is identical in computational effort to a normal filtering step. The only additional step is the computation of the weighted sum of the input and the filtered image datasets. However, since this comprises preferentially only two multiplications and one sum for each data point, the overall computational effort is small.

The resulting output image dataset is ideally weighted between the original and the filtered dataset such that it looks like an image produced with a spatially varying filter, for example a filter using a spatially varying kernel.

According to a preferred embodiment, the input image dataset has a spatially varying pixel or voxel size. In other words, the pixels/voxels are not equally spaced in Cartesian coordinates. An example of such an image dataset is one where the pixels/voxels are spaced along several rays radially extending from a centre point, as could be the case in acoustic coordinates.

According to another embodiment, the input image dataset has a spatially varying noise distribution. This is another application where it is advantageous to apply a spatially varying smoothing filter, to thereby smooth the image more strongly in some areas. An example of an image dataset where it is desired to smooth more strongly in certain areas will be given later.

As mentioned above, the input image dataset is preferably a raw image dataset obtained by medical ultrasound imaging. These types of datasets may be fan-shaped, as obtained by an ultrasound probe scanning a flat fan-shaped tissue section with several divergent beams. Alternatively, the raw image dataset may be a 3D cone-shaped dataset obtained by rotating a probe having a fan-shaped field of view through the imaged object, or a 3D dataset obtained by panning a 2D probe through a certain sector in space. As another alternative, the input image dataset may be a 3D or 4D image dataset acquired with a matrix-probe, which is designed to scan a complete 3D volume without mechanical movement of the probe.

Such fan- or cone-shaped datasets are classical examples for datasets having a spatially varying pixel/voxel size, where it is advantageous to apply the filtering method of the invention such that those areas with smaller pixel size are filtered or noise-reduced more strongly than those areas with a large pixel size, such as in the far-field. Preferably, the input image dataset is in acoustic coordinates, which could be the case for fan-shaped or cone-shaped raw image datasets obtained by medical ultrasound imaging. Preferably, such cone-shaped image datasets are obtained with a so-called TEE-probe (Transesophageal echocardiogram). A TEE probe is swallowed by the subject and thus is inserted into the esophagus to approach the heart. The probe is then rotated to thereby acquire a set of fan-shaped images in different rotational angles. These images may be combined to a 3D cone-shaped dataset. This is also called rotational ultrasound.

The spatially varying weighting function is preferably varying linearly, quadratically or cubically with at least one coordinate direction (or in other words, spatial variable) of the dataset. The power of the polynomial variation is preferably related to the number of dimensions in which the pixel/voxel size varies spatially, i.e. if the pixel/voxels have constant height, but their width and length increase in one direction, the weighting function should vary quadratically. The weighting function preferably varies with 1, 2, 3 or even 4 coordinate directions (including the time coordinate). Less preferably, the spatially varying function may not be described by an algebraic function and may thus have any desired variation over the dataset.

The output image dataset is preferably visualized, for example by generating a two-dimensional perspective image by means of rendering.

Rendering is a process by which a two-dimensional perspective image is generated from a 3D dataset. In surface rendering, for example, the interfaces between different structures in the 3D dataset are extracted from the image data. These interfaces are then illuminated with a virtual light source, and the visual impression is computed and thus a 2D perspective image generated. Surface rendering is used for example to produce a picture of the face of a fetus from 3D ultrasound data obtained from pregnant women, or for visualizing structures of the heart.

In a volume rendering process, the voxels of a 3D image volume are classified according to their optical properties, for example into transparent or opaque. In a next step a 2D image is generated which corresponds to a view onto the 3D image dataset from a certain line of vision.

Since such rendering techniques are very useful for diagnostic purposes, but require filtered image data, the filtering method of the invention is preferably applied to a 3D dataset before the rendering step.

Finally, the rendered image is preferably viewed on a screen or printed to hardcopy.

So far, the invention has been described primarily for an embodiment in which one filtered image dataset is combined with one unfiltered (input) image dataset. However, the invention also covers the case of several filtered datasets obtained by different filtering algorithms, which are combined with each other, and possibly also with the input dataset. In this embodiment, at least two, alternatively three, four, five or more filtered image datasets $S_1, S_2, S_3, \ldots$ are computed with different filtering algorithms. The output image dataset O is preferably a linear combination of the at least two filtered image datasets $S_1, S_2$ and optionally the input image dataset I:

$$O(X)=S_1(X)W_1(X)+S_2(X)W_2(X)+I(X)W_3(X)$$

wherein I(X) is a pixel/voxel value of the input image dataset at one position, and $S_1(X)$, $S_2(X)$ are pixel/voxel values of two filtered image datasets at the corresponding positions. The respective weights $W_1(X)$, $W_2(X)$, $W_3(X)$ can be computed from at least one spatially varying weighting function. Preferably, the sum of all weights at each pixel/voxel is 1. The weights $W_1$, $W_2$, $W_3$ may be described by one weighting function each, or by one poly-dimensional weighting function.

It may be useful to combine two differently filtered image datasets $S_1(X)$ and $S_2(X)$ with each other, with or without the input image dataset. In the latter case, the weight $W_3$ will be zero for all X.

The invention is also directed to an apparatus for processing an image dataset. The apparatus may be an ultrasound scanner. However, since the inventive method may be carried out offline, i.e. on data acquired previously, the apparatus may also be any computer system such as PC or workstation. The apparatus requires essentially a data storage, such as a conventional hard disk, and a computing unit such as a conventional processor. In addition, the apparatus may have all other components of a computer system, such as motherboard, a display unit such as a computer screen, a keyboard and a mouse. In particular, the apparatus preferably comprises a screen adapted for displaying the output image dataset. Furthermore, the apparatus is preferably capable of carrying out the method of the invention.

Furthermore, the invention is directed to a data carrier containing electronically readable signals, which may interact with a programmable computer system to thereby execute the method of the invention. The data carrier is preferably an electronically readable medium such as a CD-ROM, diskette, hard disk or DVD.

Finally, the invention is directed to a computer programme product comprising programme code for executing the inventive method, whenever the programme is executed on a computer. The computer programme product is preferably stored on the above-mentioned data carrier.

BRIEF DESCRIPTION OF THE DRAWINGS

Preferred embodiments of the invention shall now be described with reference to the accompanying drawings, which show.

DETAILED DESCRIPTION

Figure 1:
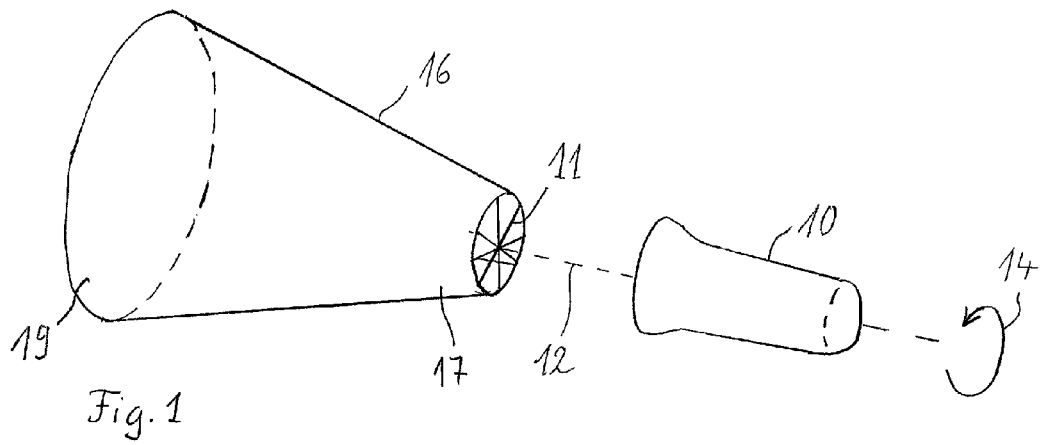
FIG. 1 a schematic perspective view of a TEE probe and its field of view.

FIG. 1 is a schematic drawing of an ultrasound probe 10 which may be used to take a transesophageal echocardiogram (TEE). Such probes 10 are adapted to scan a fan-shaped image slice, as depicted in FIG. 2.

When rotating the probe 10 around its axis 12, as shown by arrow 14, a number of radial slices 11 may be acquired.

The field of view 16 of such a probe 10 is therefore approximately cone-shaped. In the so-called near-field 17, i.e. the area nearer to the probe 10, the ultrasound rays converge, and therefore the data points corresponding to neighbouring voxels are closer together. This is exemplified in FIG. 2 by pixel 21. In the area further away from the probe 10, the so-called far-field 19, the ultrasound rays diverge, and therefore the data points corresponding to one voxel are further apart, as exemplified by voxel 22 in FIG. 2.

Figure 2:
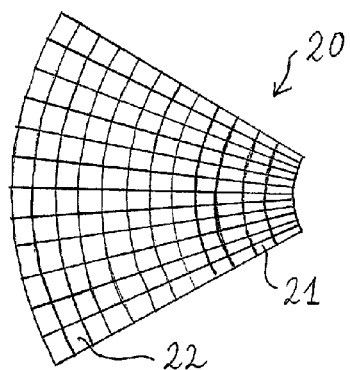
FIG. 2 a schematic representation of a fan-shaped image dataset.

Please note that the 2D image dataset of FIG. 2 may be generated with any kind of ultrasound probe adapted for 2D imaging, not only the TEE probe 10 shown in FIG. 1. Thus, the inventive method may be applied to any type of ultrasound image data.

Figure 3:
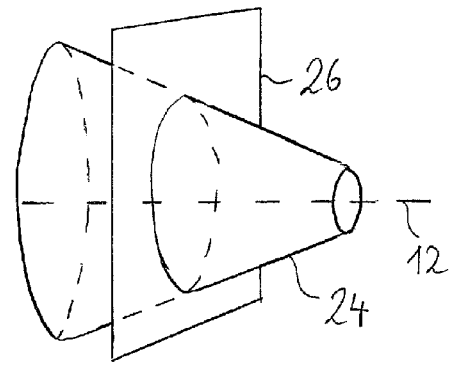
FIG. 3 a schematic representation of a cone-shaped image dataset obtained by rotational ultrasound.
Figure 4:
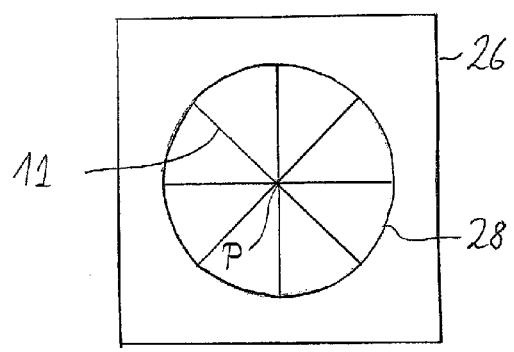
FIG. 4 a schematic representation of one slice through the dataset of FIG. 3.

FIG. 3 demonstrates further the principle of rotating ultrasound: A cone-shaped 3D dataset 24 can be generated for example with TEE probe 10 according to FIG. 1. For visualization, a plane 26 is placed through the cone-shaped dataset 24, perpendicular to axis 12, and the data points along plane 26 are extracted. The image slice 28 hereby generated is shown in FIG. 4. The 2D image dataset 28 is essentially circular and is build up by image data spaced along radial lines 11, which ideally should all cross the centre point P. As will be explained in more detail below, it can be advantageous to apply the method of the invention on this type of dataset 28.

Figure 5:
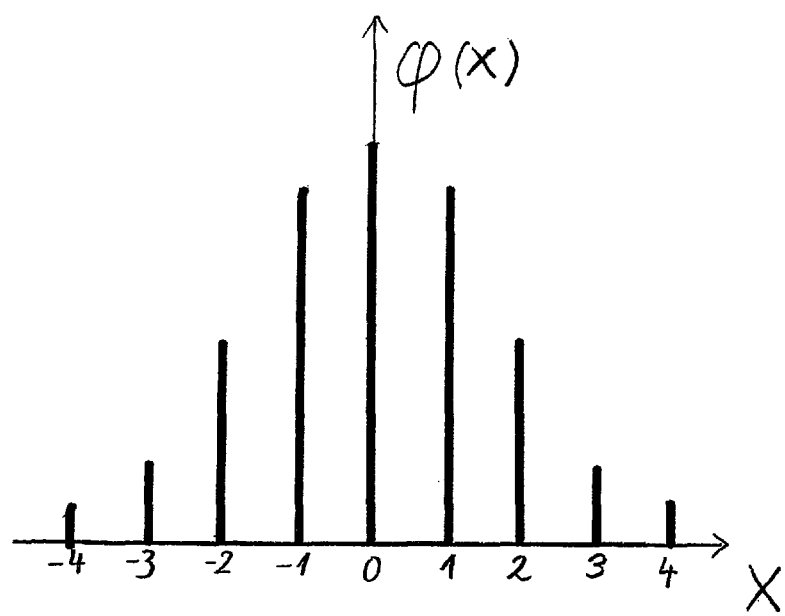
FIG. 5 a graph of a discrete Gaussian kernel.
Figure 6:
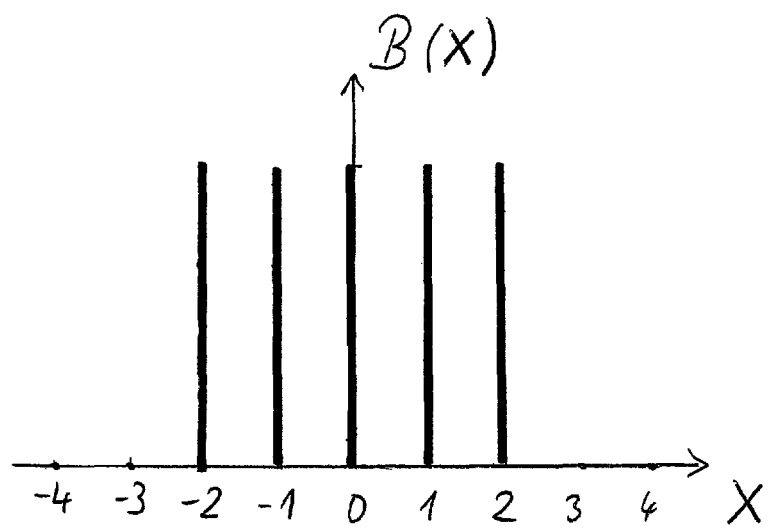
FIG. 6 a graph of a discrete box function kernel.

According to the inventive method, a filtering algorithm is applied on the input dataset, which may have a format as shown in FIG. 2 or 4, or any other format. Preferably, the filtering algorithm is a kernel smoother, whereby each data point is averaged with its neighbours in the image according to a certain kernel function. FIGS. 5 and 6 show examples of suitable kernels.

Please note that, while FIGS. 5 and 6 show 1D kernels, the same kernel functions may be 2D or 3D. For this reason, the Figures show the kernel functions depending on an unspecified variable X, which may be any spatial variable such as x, y, z in Cartesian coordinates, or r in polar coordinates. Usually, the kernel function will be isotropic. Furthermore, since the kernel is applied to a dataset with discrete data points, it is preferably also discrete. Ideally, the sum of every value of the kernel function will be 1, since this avoids any normalisation during the filtering step.

FIG. 5 shows an example of a 1D Gaussian function $\phi(X)$ with 9 data points. Below −4 and above 4, the value of the kernel function will be 0. Thus, a filtering or smoothing step using this kernel will result in an averaging over the nearest 9 pixels.

FIG. 6 shows an example of a box function $B(X)$ with 5 data points. If this function is in 2D, it should be 5×5 box function, wherein each point has a value of 0.04, so that the sum of all data points is 1. However, please note that other kernel functions may also be used.

Figure 7:
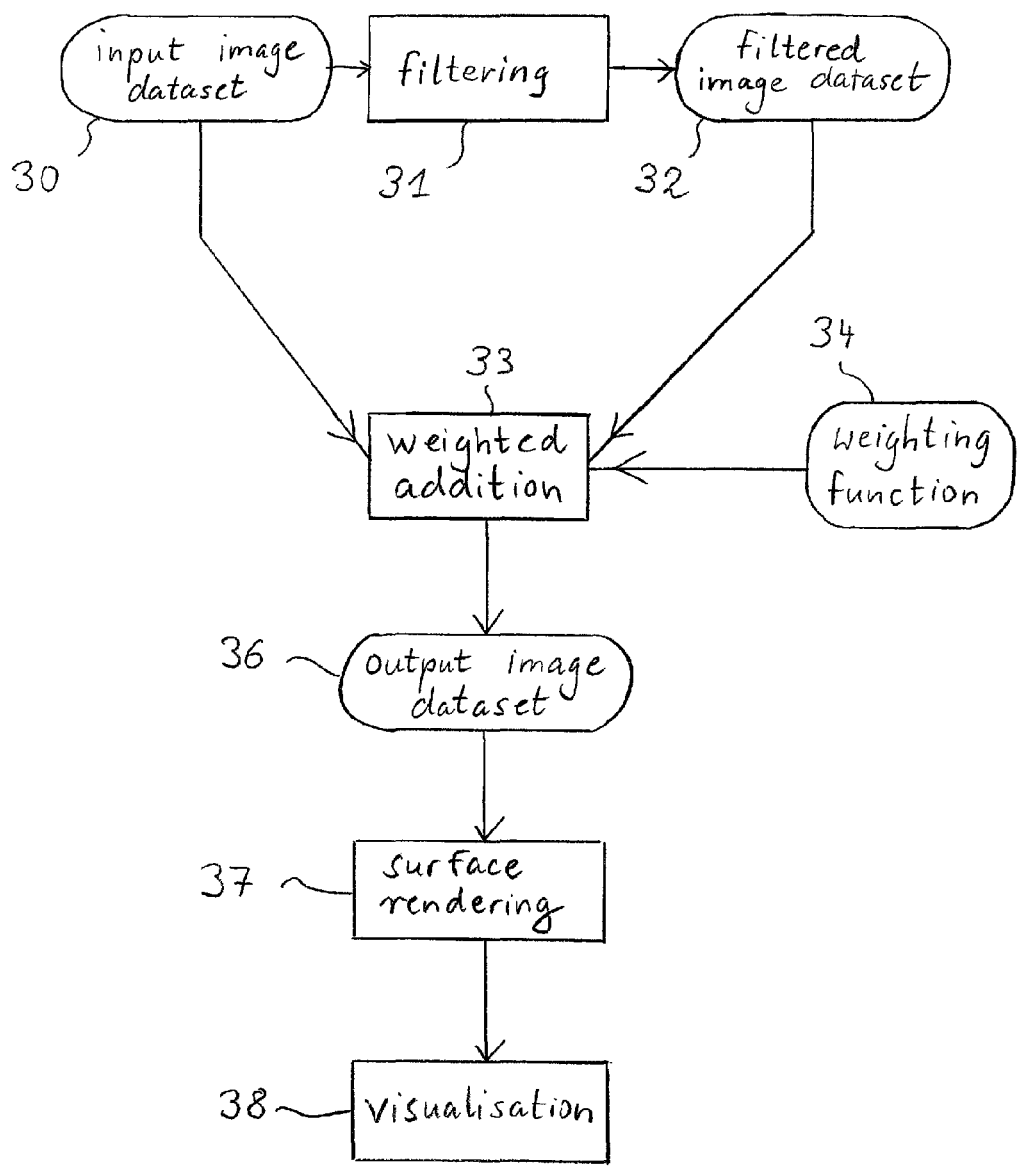
FIG. 7 a flow chart of an embodiment of the method according to the invention.

FIG. 7 shows an overview of a method according to preferred embodiment of the invention. An input image dataset 30 is received from an input source, e.g. from an ultrasound machine, from a data storage (offline) or from a network. The input image dataset is filtered in step 31, preferably with a kernel filter with a fixed kernel size, e.g. a Gaussian smoothing filter with a kernel size of 5×5 in the azimuthal and elevational direction. Thereby, a filtered image data set 32 is generated. The original (unfiltered) input image dataset is kept.

At 34, a spatially varying weighting function between the filtered and the input image dataset is either computed, or provided from some input source. Since this function is simple to evaluate, e.g. a linear, quadratic or other polynomial ramp between the near-field and the far-field, it can be computed voxel by voxel in real time.

In step 33, the input image dataset and the filtered image dataset are added, thereby using the spatially varying weighting function 34, e.g. using the formula cited above. The result of this weighted addition 33 is an output image dataset 36 having the same data structure as the input image dataset 30 and the filtered image dataset 32. If a suitable weighting function 34 has been used, the output image dataset 36 may for example achieve good smoothing in the near-field, while keeping the detail in the far-field.

Optionally, surface or volume rendering is applied on the output image dataset 36 in step 37. The result of the rendering is visualized e.g. on a screen in step 38.

The whole method as shown in FIG. 7 may be carried out in real time. This means that the practitioner may view the filtered and rendered image immediately after acquiring the image data, without any noticeable waiting times in-between.

The filtering method of the invention can be used for black and white image data or for colour image data.

Two different preferred applications of the invention shall now be described with reference to FIGS. 8-10 and 11-14, respectively.

Figure 8:
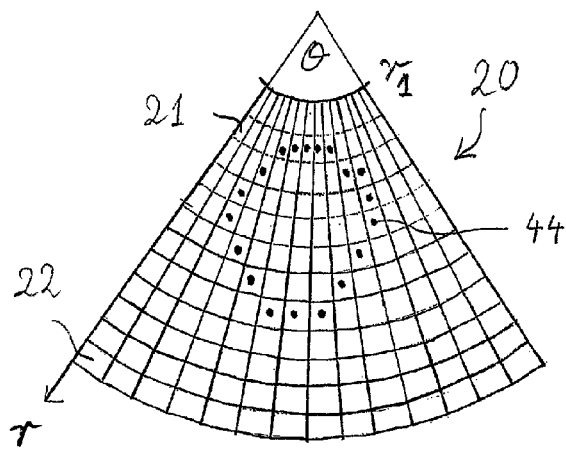
FIG. 8 a schematic representation of an image dataset in polar coordinates.

FIG. 8 shows a 2D fan-shaped input image dataset, which may for example be generated by ultrasound. The slice spans an angle of $\theta$, and the radial dimension (range) is shown as r. The raw image data are in acoustic coordinates, which has the consequence that pixels such as pixel 21 close to the origin are small, while pixels 22 in the far-field cover a larger area in real space. Thus, the image dataset 20 has a spatially varying pixel size.

Figure 9:
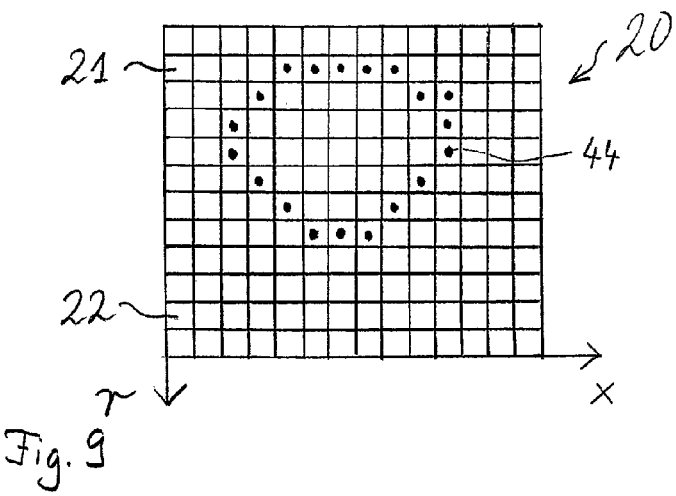
FIG. 9 a schematic representation of the image dataset of FIG. 8, shown distorted onto Cartesian geometry.

To demonstrate the consequences of this spatially varying pixel size on the filtering algorithm, the same dataset 20 is shown in FIG. 9 spread onto Cartesian coordinates, but without a re-sampling step. Therefore, the structure 44, which is shown as a circle of dots, is severely distorted. If a standard filtering algorithm using a fixed size kernel would be applied to the dataset of FIG. 8, it would be impossible to select a kernel size which is optimal for both the near-field and the far-field: If the filter is set up such that the near-field, (e.g. pixel 21) looks good, the far-field would be too blurred, due to the large kernel size. On the other hand, if the filter is designed for the far-field to look good, the smoothed image is often not enough smoothed in the near-field.

Therefore, the invention provides a method wherein different degrees of smoothing may be applied to different areas of the image dataset, while still using a smoothing algorithm which is essentially unvarying over the dataset, e.g. by using a fixed-size kernel.

For example, a box-size kernel with size 3×3 may be applied on dataset 20.

Figure 10:
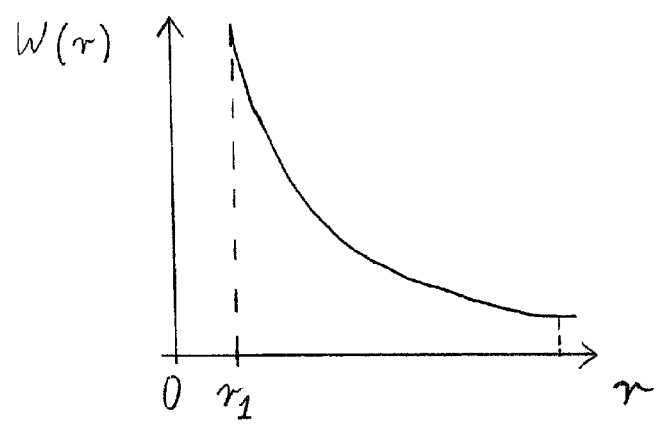
FIG. 10 a graph of a weighting function.

A suitable weighting function W(r) for this dataset is shown in FIG. 10: The weighting function W(r) is independent of angle $\theta$, but has a quadratic fall off from the near-field to the far-field, i.e. it is proportional to 1/r, wherein r is the range direction. This is because we have quadratic kernel 3×3, the weighting function should also vary quadratically. The first data point $W(r_1)$ of the weighting function corresponds to the first pixel row in dataset 20, which is at a certain distance $r_1$ from the origin.

Figure 11:
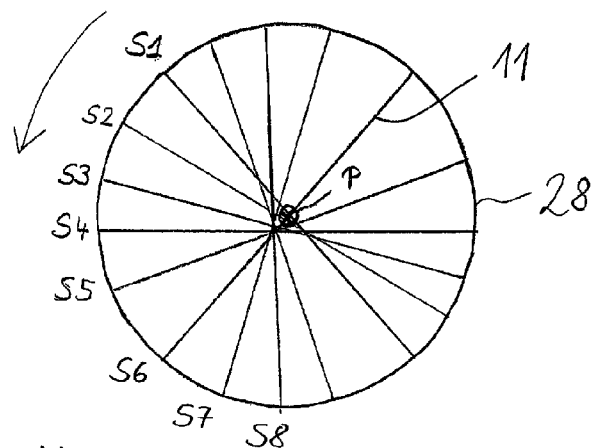
FIG. 11 a schematic representation of a 2D dataset obtained by rotational ultrasound.

FIG. 11 shows a different type of dataset 28, which is the type of circular image plane which may be obtained by putting a slice through a cone-shaped dataset 24 acquired by means of rotating ultrasound, see FIGS. 3 and 4. As mentioned above, the dataset is acquired slice by slice, while the probe 10 is rotated e.g. by a small electric machine. However, during the acquisition period, the subject will usually move, so that the slices S1, S2, ..., S8 will not be ideally located, and in particular will not all cross the centre point P. Furthermore, it is possible that the electric machine is not precise, so that the angles between adjacent slices will not be exactly identical.

However, these deviations cannot be traced, so that the observer has to assume that the centre point of each slice S1, S2, ..., S8 will be at the position of point P. To alleviate the artefacts created by these impositions, one should apply a comparatively strong smoothing or filtering algorithm in the centre of dataset 28. The peripheral regions of dataset 28, by contrast, can be filtered to a lesser degree.

Figure 12:
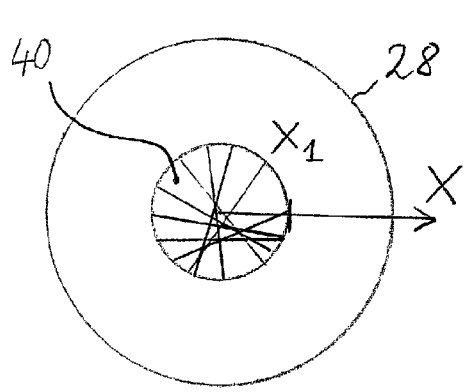
FIG. 12 the dataset of FIG. 11, highlighting the inner region.
Figure 13:
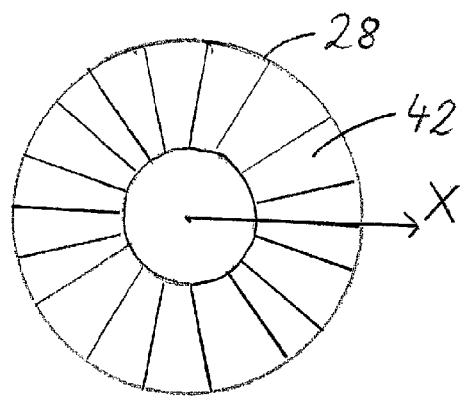
FIG. 13 the dataset of FIG. 11, highlighting the outer region.

This is demonstrated in FIGS. 12 and 13, wherein FIG. 12 highlights the inner ring 40, which extends up to radial coordinate $X_1$ and requires more filtering to avoid artefacts in this region. The outer ring 42 is depicted in FIG. 13 and requires less filtering/smoothing.

Figure 14:
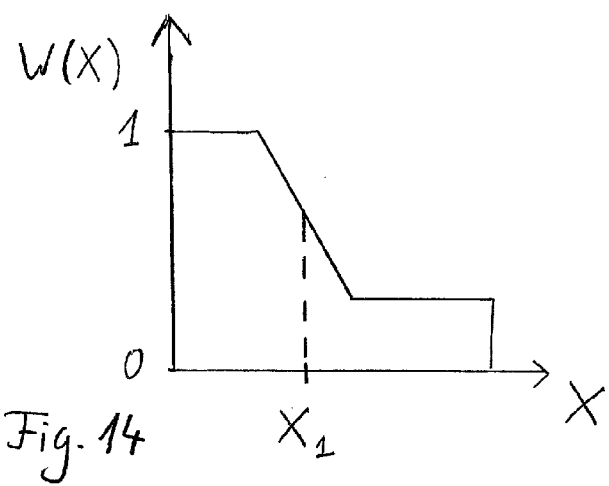
FIG. 14 a graph of a weighting function.

After a filtering step e.g. with fixed size kernel has been applied to dataset 28, the original and the filtered datasets may be combined using the weighting function W(X) shown in FIG. 14. This weighting function has a plateau of value 1 near the centre (X=0), and another plateau at a lower value in the area of the outer ring 42. At the boundary, i.e. at the radial coordinate $X_1$, a linear ramp is provided between the two plateaus. Alternatively, the weighting function may be a step function between the central area 40 and the outer ring 42.

Figure 15:
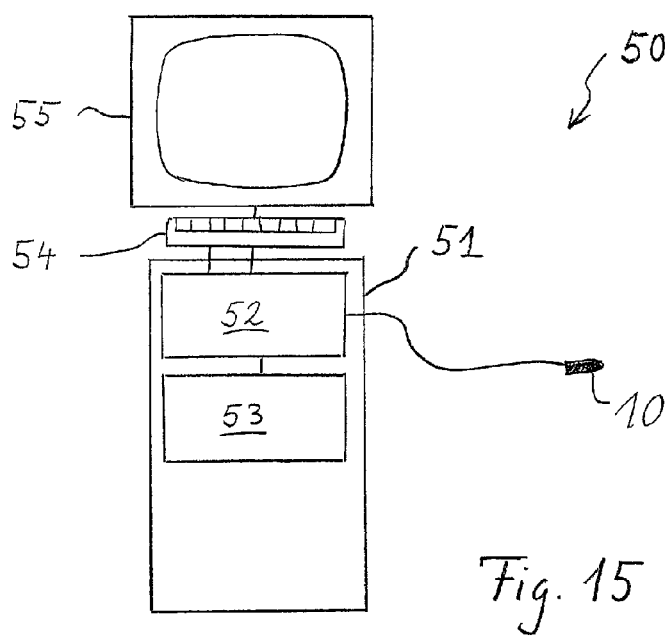
FIG. 15 a schematic representation of an embodiment of the apparatus according to the invention.

FIG. 15 shows a preferred embodiment of the apparatus according to the invention. The invention can be embodied in an ultrasound machine 50 comprising a probe 10, such as the TEE probe shown in FIG. 1. The probe is connected to the control unit 51 of the ultrasound machine 50, which comprises a processing unit 52 and a data storage unit 53 which are adapted to perform the method according to the invention. In addition, the processing unit 52 may be connected to a keyboard 54 and optionally a mouse or other cursor control device (not shown). Furthermore, a screen 55 for viewing the output image dataset is also provided.

Alternatively, the method of the invention may be carried out offline on any type of computer system, which need not be part of an ultrasound machine.

Figure 16:
FIG. 16 an image rendered from 3D raw ultrasound data of the heart, unfiltered.
Figure 17:
FIG. 17 an image rendered from the same 3D raw ultrasound data of the heart of FIG. 16, but after the filtering method of the invention was applied.

Finally, FIGS. 16 and 17 demonstrate the effect of the filtering method of the invention to reduce near-field artefacts, while keeping far-field detail. FIG. 16 is a surface-rendered image generated from a 3D ultrasound dataset of the heart. The 3D input dataset was generated by panning an ultrasound probe having a fan-shaped field-of-view, so that the input image dataset has a smaller pixel size in the near-field and a larger pixel-size in the far-field. FIG. 16 shows the image rendered from the original raw data. Since no filtering has been applied, blocky artefacts are visible in the near-field.

On the same raw image dataset, the filtering method according to the invention was applied. A 5×5 kernel was used in the azimuthal-elevation direction, and a weighting function with a quadratic fall off from the near- to the far-field was used, due to the quadratic kernel N×N. From the thus computed output image dataset, a rendered image was generated using the same rendering algorithm as for FIG. 16.

As can be seen on FIG. 17, a good filtering was achieved in the near-field, while keeping detail in the far-field.

The invention claimed is:

1. A method of filtering an image dataset, comprising the steps of:
    providing an N-dimensional medical input image dataset acquired with ultrasound;
    applying a filtering algorithm to the input image dataset, wherein the filtering algorithm is essentially unvarying over the dataset, to thereby obtain a filtered image dataset; wherein this step may be repeated with different filtering algorithms to thereby obtain further filtered image datasets;
    providing a pre-determined spatially varying weighting function between the input and the at least one filtered image dataset;
    computing a weighted sum of the input image dataset and the at least one filtered image dataset, thereby using the spatially varying weighting function, in order to obtain an output image dataset,
    wherein the N-dimensional input image dataset contains image data in the form of pixel/voxel values, and the spatially varying weighting function is independent of the pixel/voxel values of the input image dataset, and that the spatially varying weighting function depends on the geometry of the input image data set, namely the distribution and configuration of its pixels/voxels in space, wherein the input image dataset has a spatially varying pixel/voxel size.

2. The method of claim 1, wherein the filtering algorithm is a noise reduction algorithm, and the filtered image dataset is a noise reduced image dataset.

3. The method of claim 1, wherein the input image dataset is an image dataset having a spatially varying noise distribution.

4. The method of claim 1, wherein the input image dataset is a raw image dataset obtained by medical ultrasound imaging.

5. The method of claim 1, wherein the input image dataset is a dataset in acoustic coordinates.

6. The method of claim 1, wherein the input image dataset is a dataset obtained by rotational ultrasound.

7. The method of claim 1, wherein the filtering algorithm comprises a kernel filtering algorithm using a kernel size which does not vary over the dataset.

8. The method of claim 1, wherein the spatially varying weighting function is varying linearly, quadratically or cubically in at least one coordinate direction (r, X) of the dataset.

9. The method according to claim 1, wherein the output image dataset is a three-dimensional dataset, and wherein the method further comprises
    generating a two-dimensional perspective image from the output image dataset by means of rendering.

10. The method according to claim 1, wherein at least two filtered image datasets are computed with different filtering algorithms, and wherein the output image dataset is a linear combination of the at least two filtered image datasets with or without the input image dataset, the weights of the linear combination being described by at least one spatially varying weighting function.

11. A method of filtering an image dataset, having the following steps:
    providing an N-dimensional medical input image dataset acquired with ultrasound;
    applying a first filtering algorithm to the input image dataset, wherein the filtering algorithm is essentially unvarying over the dataset, to thereby obtain a first filtered image dataset;
    applying a second filtering algorithm to the input image dataset, wherein the filtering algorithm is essentially unvarying over the dataset, to thereby obtain a second filtered image dataset; wherein this step may be repeated with different filtering algorithms to thereby obtain further filtered image datasets;
    providing a pre-determined spatially varying weighting function between the at least two filtered image dataset and optionally the input image dataset;
    computing a weighted sum of the at least two filtered image datasets, or a weighted sum of the at least two filtered image datasets and the input image dataset, thereby using the spatially varying weighting function, in order to obtain an output image dataset,
    wherein the N-dimensional input image dataset contains image data in the form of pixel/voxel values, and the spatially varying weighting function is independent of the pixel/voxel values of the input image dataset, and that the spatially varying weighting function depends on the geometry of the input image data set, namely the distribution and configuration of its pixels/voxels in space, wherein the input image dataset has a spatially varying pixel/voxel size.

12. An apparatus for processing an image dataset, wherein the apparatus comprises:
    a data storage unit in which an N-dimensional medical input image dataset acquired with ultrasound is stored, and which is capable of storing further image datasets as well as a pre-determined spatially varying weighting function;

a computing unit, which is adapted to apply a filtering algorithm to the input image dataset, wherein the filtering algorithm is essentially unvarying over the dataset, to thereby obtain a filtered image dataset, and which is adapted to compute a weighted sum of the input image dataset and the filtered image dataset, thereby using the spatially varying weighting function, in order to obtain an output image dataset wherein the N-dimensional input image dataset contains image data in the form of pixel/voxel values, and the spatially varying weighting function is independent of the pixel/voxel values of the input image dataset, and that the spatially varying weighting function depends on the geometry of the input image data set, namely the distribution and configuration of its pixels/voxels in space, wherein the input image dataset has a spatially varying pixel/voxel size.

13. The apparatus according to claim 12, further comprising a screen adapted for displaying the output image dataset.

14. The apparatus according to claim 12, which is capable of carrying out the method comprising:
providing an N-dimensional input image dataset;
applying a filtering algorithm to the input image dataset, wherein the filtering algorithm is essentially unvarying over the dataset, to thereby obtain a filtered image dataset; wherein this step may be repeated with different filtering algorithms to thereby obtain further filtered image datasets;
providing a pre-determined spatially varying weighting function between the input and the at least one filtered image dataset;
computing a weighted sum of the input image dataset and the at least one filtered image dataset, thereby using the spatially varying weighting function, in order to obtain an output image dataset.

15. Data carrier containing electronically readable signals, which may interact with a programmable computer system to thereby execute the method according to claim 1, wherein the data carrier is a storage device.

16. Computer program product recorded on a non-transitory electronically recordable medium comprising program code for executing the method according to claim 1 whenever the program is executed on a computer.

17. The method of claim 1, wherein the spatially varying weighting function is an algebraic function or a pre-determined scalar dataset.

18. A method of filtering an image dataset, comprising the steps of:
providing an N-dimensional medical input image dataset acquired with ultrasound;
applying a filtering algorithm to the input image dataset, wherein the filtering algorithm is essentially unvarying over the dataset, to thereby obtain a filtered image dataset; wherein this step may be repeated with different filtering algorithms to thereby obtain further filtered image datasets;
providing a pre-determined spatially varying weighting function between the input and the at least one filtered image dataset;
computing a weighted sum of the input image dataset and the at least one filtered image dataset, thereby using the spatially varying weighting function, in order to obtain an output image dataset,
wherein the N-dimensional input image dataset contains image data in the form of pixel/voxel values, and the spatially varying weighting function is independent of the pixel/voxel values of the input image dataset, and that the spatially varying weighting function depends on the geometry of the input image data set, namely the distribution and configuration of its pixels/voxels in space, wherein the input image dataset has a spatially varying pixel/voxel size, and the spatially varying weighting function depends on the acquisition modality of the input image data set.

19. The computer program product according to claim 16, wherein the electronically recordable medium is selected from the group consisting of CD-ROM, diskette, hard disk, and DVD.

20. The apparatus according to claim 12, wherein the data storage unit is selected from the group consisting of CD-ROM, diskette, hard disk, or DVD.

* * * * *